(12) United States Patent
Lynch et al.

(10) Patent No.: US 12,039,266 B2
(45) Date of Patent: Jul. 16, 2024

(54) METHODS AND SYSTEM FOR THE EXTRACTION OF PROPERTIES OF VARIABLES USING AUTOMATICALLY DETECTED VARIABLE SEMANTICS AND OTHER RESOURCES

(71) Applicant: INTERNATIONAL BUSINESS MACHINES CORPORATION, Armonk, NY (US)

(72) Inventors: William Karol Lynch, Rathkeale (IE); Sean A. McKenna, Reno, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 17/138,854

(22) Filed: Dec. 30, 2020

(65) Prior Publication Data
US 2022/0207238 A1  Jun. 30, 2022

(51) Int. Cl.
*G06F 40/279*  (2020.01)
*G06F 17/14*  (2006.01)
(Continued)

(52) U.S. Cl.
CPC ............ *G06F 40/279* (2020.01); *G06F 17/14* (2013.01); *G06F 40/111* (2020.01); *G06F 40/205* (2020.01); *G06F 40/284* (2020.01); *G06F 40/289* (2020.01); *G06F 40/295* (2020.01); *G06F 40/30* (2020.01)

(58) Field of Classification Search
CPC ...... G06F 40/111; G06F 40/30; G06F 40/205; G06F 40/279; G06F 40/284; G06F 40/289; G06F 40/295
See application file for complete search history.

(56) References Cited

U.S. PATENT DOCUMENTS 9,613,134 B2    4/2017  Hu et al.
2011/0144961 A1*  6/2011  Ishikawa ................. G06F 30/20
                                                    703/2

(Continued)

OTHER PUBLICATIONS

Schubotz et al., "Semantification of identifiers in mathematics for better math information retrieval." Proceedings of the 39th International ACM SIGIR conference on Research and Development in Information Retrieval (Year: 2016).*

(Continued)

*Primary Examiner* — Samuel G Neway
(74) *Attorney, Agent, or Firm* — Intelletek Law Group, PLLC; Gabriel Daniel, Esq.

(57) ABSTRACT

A computer-implemented method of extracting properties of one or more variables of a mathematical transformation in a document identified by automatic feature engineering (AFE) is provided. The document is parsed to extract at least one of a mathematical formula including identifying data, a textual description of the one or more variables of the mathematical transformation, or a category identifier to which the document belongs. Constraints are determined to apply to the one or more variables extracted from the mathematical transformations in the document. At least one candidate feature is automatically generated from a portion of an input data that conforms to the determined constraints.

15 Claims, 8 Drawing Sheets

(51) Int. Cl.
*G06F 40/111* (2020.01)
*G06F 40/205* (2020.01)
*G06F 40/284* (2020.01)
*G06F 40/289* (2020.01)
*G06F 40/295* (2020.01)
*G06F 40/30* (2020.01)

(56) References Cited

U.S. PATENT DOCUMENTS

| | | | |
|---|---|---|---|
| 2013/0024487 A1* | 1/2013 | Yi | G06F 40/111 |
| | | | 708/136 |
| 2013/0268263 A1* | 10/2013 | Park | G06F 40/30 |
| | | | 704/9 |
| 2014/0039878 A1* | 2/2014 | Wasson | G06F 40/40 |
| | | | 704/9 |
| 2014/0115447 A1* | 4/2014 | Elseth | G06F 17/10 |
| | | | 715/249 |
| 2018/0307710 A1 | 10/2018 | Dai et al. | |
| 2018/0357207 A1* | 12/2018 | Yi | G06F 40/109 |
| 2019/0163726 A1* | 5/2019 | Cai | G06F 40/211 |
| 2021/0117853 A1* | 4/2021 | Lynch | G06N 5/02 |
| 2022/0207238 A1* | 6/2022 | Lynch | G06F 40/279 |

OTHER PUBLICATIONS

Alexeeva et al., "MathAlign: Linking formula identifiers to their contextual natural language descriptions." Proceedings of the Twelfth Language Resources and Evaluation Conference (Year: 2020).*

U.S. Appl. No. 16/659,249, "Methods and Systems for Automated Feature Generation Utilizing Formula Semantification", filed Oct. 21, 2019; 40 pgs.

Mell, P. et al., "Recommendations of the National Institute of Standards and Technology"; NIST Special Publication 800-145 (2011); 7 pgs.

Chien, P. et al., "Semantic Tagging of Mathematical Expressions"; International World Wide Web Conference Committee (2015); pp. 195.

Kristianto, G. K. et al., "Extracting Textual Descriptions of Mathematical Expressions in Scientific Papers"; D-Lib Magazine (2014); vol. 20:11/12; 16 pgs.

Nevzorova, O. et al., "The Semantic Context Models of Mathematical Formulas in Scientific Papers"; Proceedings of the XX International Conference Data Analytics and Management in Data Intensive Domains (2018); pp. 33-40, Moscow, Russia.

Baker, J. B. et al., "A Linear Grammar Approach to Mathematical Formula Recognition from PDF"; Research Gate (2014); 17 pgs.

Staar, P. et al., "Corpus Conversion Service: A Machine Learning Platform to Ingest Documents at Scale"; arXiv:1806.02284v1 [cs.DL] (2018); 9 pgs.

Stuber, J. et al., "Extracting Mathematical Semantics from Latex Documents"; https://www.semanticscholor.org; downloaded Oct. 28, 2020; 3 pgs.

WolframAlpha Computational Intelligence, Compute expert-level answers using Wolfram's breakthrough algorithms, knowledgebase and technology; https://www.wolframalpha.com, downloaded Oct. 28, 2020; 2 pgs.

WolframAlpha; Wikipedia, https://en.wikipedia.org, downloaded Oct. 28, 2020; 7 pgs.

Pathak, A. et al., "Extracting Context of Math Formulae Contained inside Scientific Documents"; Computación y Sistemas (2019); vol. 23:3; pp. 803-818.

Schubotz, M. et al., "Improving the Representation and Conversion of Mathematical Formulae by Considering their Textual Context"; arXiv:1804.04956v1 [cs.DL] (2018); 11 pgs.

Zhang, D. et al., "The Gap of Semantic Parsing: A Survey on Automatic Math Word Problem Solvers"; rXiv:1808.07290v2 [cs.CL] (2019); 18 pgs.

* cited by examiner

200

Variable Properties

205

Human Age:
must be non-negative and is most likely constrained to a maximum value of ~130. Values have units of years, months, weeks, days, hours and or minutes. Fractions of these may not be modulo 10 (e.g., seconds and minutes are modulo 60). Human age may be expressed as a decimal, or in units of time containing different units: Years, Days, Hours and Minutes

215

Concentration:
must be non-negative, unless it is a pH concentration that is measured as the negative log of the hydrogen ion concentration. Concentration can be expressed as a mass per volume or a relative concentration that is based on an initial concentration. Concentration ranges from 0 to +infinity. Concentration values are continuous with multiple levels of significance.

225

Day of week:
These can be represented by integers or classes (e.g., "M", "T", "Th"). There can only be 7 unique values and there is no significant digit

235

Pressure:
Can be positive, negative or zero. Range is essentially infinite, and the values are continuous with multiple decimal points of precision (float). Common units are torr, Pascals, pounds per inch^2

Given that we know that mass is a non-negative scalar we can for example start applying the $E=mc^2$ transformation with columns containing non-negative numbers such as the first column (Age) or the third column (Unknown Column).

335

340

| AGE | TEMPERATURE | UNKNOWN | Miles per hour |
|---|---|---|---|
| 33 | -1 | 9 | 67.3 |
| 53 | 1 | 3 | 34.5 |
| 45 | -4 | 3 | 56.7 |
| 49 | 4 | 1 | 45.7 |
| 103 | 5 | 2 | 55.9 |

FIG. 3B

METHODS AND SYSTEM FOR THE EXTRACTION OF PROPERTIES OF VARIABLES USING AUTOMATICALLY DETECTED VARIABLE SEMANTICS AND OTHER RESOURCES

TECHNICAL FIELD

The present disclosure generally relates to automated feature engineering, and more particularly, to information extraction of properties and the utilization of the extracted information in automated feature engineering.

DESCRIPTION OF THE RELATED ART

Automatic Feature Engineering (AFE) is a growing area of artificial intelligence where useful features are discovered programmatically. Rather than utilizing a data scientist or domain expert, in AFE there is an application of a mathematical transformations to one or more input column combinations to generate a candidate feature followed by a test to determine if the candidate feature is useful for a regression operation, a clustering operation, a prediction operation, or a classification task at hand.

SUMMARY

According to one embodiment, a computer-implemented method of extracting properties of one or more variables of a mathematical transformation discovered in a document by automatic feature engineering (AFE) is provided. The document is parsed to extract at least one of a mathematical formula including identifying data, a textual description of the one or more variables of the mathematical transformation, or a category identifier to which the document belongs. Constraints are determined to be applicable to the one or more variables extracted from the mathematical transformations in the document. At least one candidate feature is automatically generated from a portion of an input data that conforms to the determined constraints.

In one embodiment, the input data is arranged into data input columns, and one or more of a regression operation, a clustering operation, a prediction operation, or a classification operation are performed using the generated at least one candidate feature by applying the mathematical transformations to the data input columns having data content that conforms to the determined constraints.

In one embodiment, an identifier label is extracted from the document. The identifier label identifies the variables of the mathematical transformation.

In one embodiment, an identifier name is extracted from the identifier label. The identifier name includes semantic information associated with the identities of the variables in the mathematical transformation.

In one embodiment, an identifier name is extracted from the identifier label. The identifier name is based on a domain-specific convention.

In one embodiment, the computer-implemented method further includes determining at least one constraint of the one or more variables in the document based on a content of the document.

In one embodiment, the operation of determining constraints applicable to the one or more properties of the variables further includes determining at least one constraint of the one or more variables in the document. At least one constraint is based on external information comprising one or more of ontologies, industry standards, and regulatory codes.

In an embodiment, a computer-implemented method for extracting semantic symbol properties from at least one mathematical formula includes extracting symbols from a textual context of the at least one mathematical formula in a document. Textual descriptions of the extracted symbols are generated, and semantic mappings co-located with at least one mathematical formula are generated. The properties of the extracted symbols are determined based on the textual descriptions and semantic mappings.

In one embodiment, the properties of the extracted symbols are determined by using a knowledge base.

In one embodiment, the properties of the extracted symbols are determined using an unstructured text.

In one embodiment, the properties of the extracted symbols are determined using algebraic techniques.

In one embodiment, the properties of the extracted symbols are determined using unit information provided in the formula context.

In an embodiment, a computing device is configured for automated Feature Engineering (AFE) that extracts properties of one or more variables of a mathematical transformation discovered in a document. The computing device includes a processor, and a memory coupled to the processor. The memory stores instructions to cause the processor to perform acts including parsing the document to extract at least one of a mathematical formula including identifying data, a textual description of the one or more variables of the mathematical transformation, or a category identifier to which the document belongs. Constraints that are applicable to the one or more variables extracted from the mathematical transformations in the document are determined, and at least one candidate feature is automatically generated from a portion of an input data that conforms to the determined constraints.

In one embodiment, the instructions cause the processor to perform an additional act that includes performing at least one of a regression operation, a clustering operation, a prediction operation, or a classification operation using the generated at least one candidate feature. The mathematical transformations are applied to the data input columns having data content that conforms to the determined constraints.

In one embodiment, the instructions cause the processor to perform an additional act that includes extracting an identifier label from the document that identifies the variables of the mathematical transformation.

In one embodiment, the instructions cause the processor to perform an additional act that includes extracting from the identifier label an identifier name including semantic information associated with the identities of the variables in the mathematical transformation.

In one embodiment, the instructions cause the processor to perform an additional act that includes extracting from the identifier label an identifier name based on a domain-specific convention.

In one embodiment, the instructions cause the processor to perform an additional act that includes determining at least one constraint of the one or more variables in the document based on a content of the document.

In one embodiment, the determining of constraints applicable to the one or more properties of the variables further comprises determining at least one constraint of the one or more variables in the document based on external information including one or more of ontologies, industry standards, and regulatory codes.

In one embodiment, the instructions cause the processor to perform additional acts that include extracting one or more identifiers from the document that identify the variables of the mathematical transformation, and matching the one or more extracted identifiers with concepts known in an industry class.

In an embodiment, a computer device is configured for extracting semantic symbol properties from at least one mathematical formula. The computing device includes a processor and a memory coupled to the processor. The memory storing instructions cause the processor to perform acts that include extracting symbols from a textual context of the at least one mathematical formula in a document. Textual descriptions of the extracted symbols are generated. Semantic mappings co-located with the at least one mathematical formula are generated, and properties of the extracted symbols are determined based on the textual descriptions and semantic mappings.

In an embodiment, the instructions cause the processor to perform the additional act of using a knowledge base to determine the properties of the extracted symbols.

In an embodiment, the instructions cause the processor to perform the additional act of generating mathematical transformations from the at least one mathematical formula.

In an embodiment, the instructions cause the processor to perform an additional act of generating properties of symbols in the at least one formula.

In an embodiment, the instructions cause the processor to perform the additional act of selecting data from an input data set for application of the generated mathematical transformations.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2 identifies variable properties for extraction, consistent with an illustrative embodiment.

FIG. 3B is an illustration of data columns used in conjunction with the transformation in FIG. 3A, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

The present disclosure is directed in part to including transformation discovery into an Automated Feature Engineering (AFE) application. One benefit is that a set of core transformations within an AFE application can be expanded, and the expanded core transformations lead to the automated discovery of additional features. For example, mathematical transformations can be automatically extracted from documents provided to Artificial Intelligence (AI) systems. Once transformations have been extracted from these documents, it is disclosed in the teachings of the present disclosure that there is a determination as to what constraints apply to the variables in the mathematical transformations. Particularly in fields such as machine learning, where machine learning models operate on input variables whose values are arranged in columns, the computational costs of applying the mathematical transformations to all columns, regardless of column content, is prohibitive in terms of processing power, time, and computer resources, such as storage. In the present disclosure, at least through the operation of determining constraints for the variables, data columns are excluded that are not determined to be within the constraints. Accordingly, the amount of wasted computational efforts is reduced, as well as the computational overhead.

Whereas feature engineering and transformation discovery typically use data scientists and/or a domain expert to determine constraints and search for additional features, the teachings of the present disclosure provide an improvement because variable properties can be extracted from documents where they are not explicitly specified. In addition, the automated feature engineering is more targeted and more efficient. Also, there is at least an additional advantage because there is no requirement for a semantic match to apply a mathematical transformation. Thus, the present disclosure provides both an improvement in the fields of variable property extraction from documents, as well as in AFE. There is an improvement in computer operations, as fewer computer resources (e.g., processing, storage) are used than in conventional feature discovery operations with more accurate results.

Example Architecture

Figure 1:
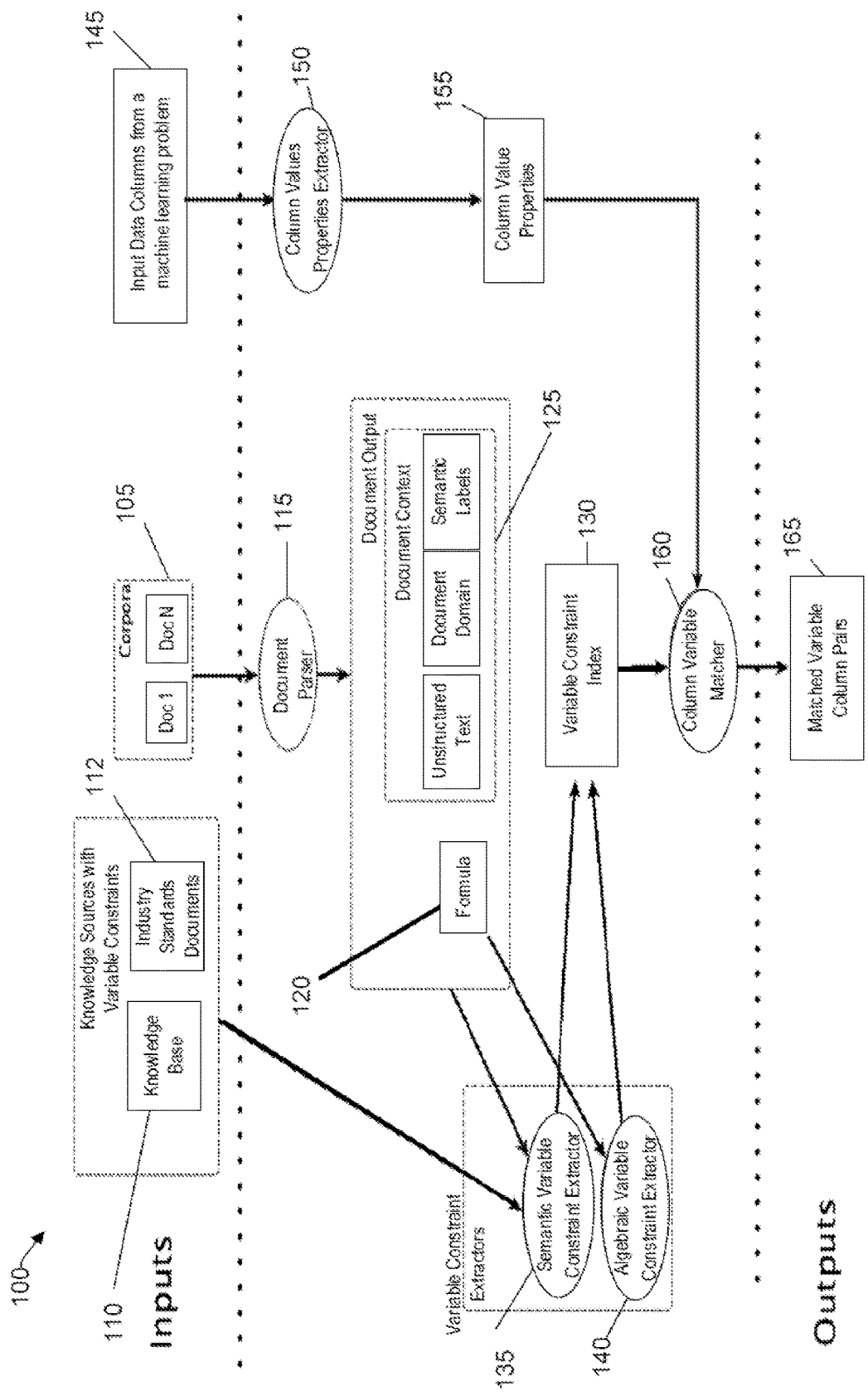
FIG. 1 provides an architectural overview of a system for extracting properties of one or more variables in a document, consistent with an illustrative embodiment.

FIG. 1 provides an architectural overview of a system for extracting properties of one or more variables in a document, consistent with an illustrative embodiment. Referring to FIG. 1, the system 100 is provided for parsing documents having mathematical formulae and extracting such mathematical formulae and identifiers, textual descriptions of variables, categories to which the document belongs, and identifier labels. Relevant external information is determined, the relevant external information including industry standards, regulatory codes, and ontologies to determine constraints.

The inputs include a knowledge base 110 and industry standards documents 112. The documents 105 are parsed by the document parser 115 and there is an output of one or more a formula 120, and the document context 125 in the form of unstructured text, document domain, and semantic labels. Variable constraint extractors include a semantic variable constraint extractor 135, and an algebraic variable constraint extractor 140. A variable constraint index 130 can reference constraints such as, for example, non-negative, real, integer, range, etc., and apply an index to extracted variables. Also shown are input data columns 145 output from a machine learning problem. A column values property extractor 150 extracts variables from the data columns and forwards the information to the column value properties 155. More particularly, the property extractor 150 is a procedure, and the column value properties 155 is the output of the procedure. The property extractor procedure 150 inspects a column and extracts the properties of the values in the column, and the column value properties 155 is the output of this procedure (e.g. 155 could be Column_A being integers, Column_B being real numbers, etc.).

The column variable Matcher 160 matches the column value properties that are appropriate for the variable constraint, and at 165 matched variable column pairs are output.

FIG. 2 illustrates variable properties 200 for extraction, consistent with an illustrative embodiment. As shown in FIG. 2, there are properties such as human age 205, concentration 215, day of the week 225, and pressure 235.

In more detail, the human age 205 must be non-negative and is most likely constrained to a maximum value of approximately 130. Values have units of years, months, weeks, days, hours, or minutes. Fractions of these units may not be modulo 10 (e.g., minutes and seconds), and can be expressed in different units.

The concentration 215 must be non-negative unless it is a pH concentration that is measured as the negative log of the hydrogen ion concentration. The concentration 205 can be expressed as, for example, mass per volume, or a relative concentration based on an initial concentration. The day of the week 225 can be represented by integers (e.g., 1 to 7) of classes (e.g., "M", "T", "W"). The pressure 235 can be positive, negative, or zero. The range is essentially infinite, and the values are continuous with multiple decimal points of precision (float). Units may be expressed as torr, Pascals, pounds per inch$^2$.

Figure 3A:
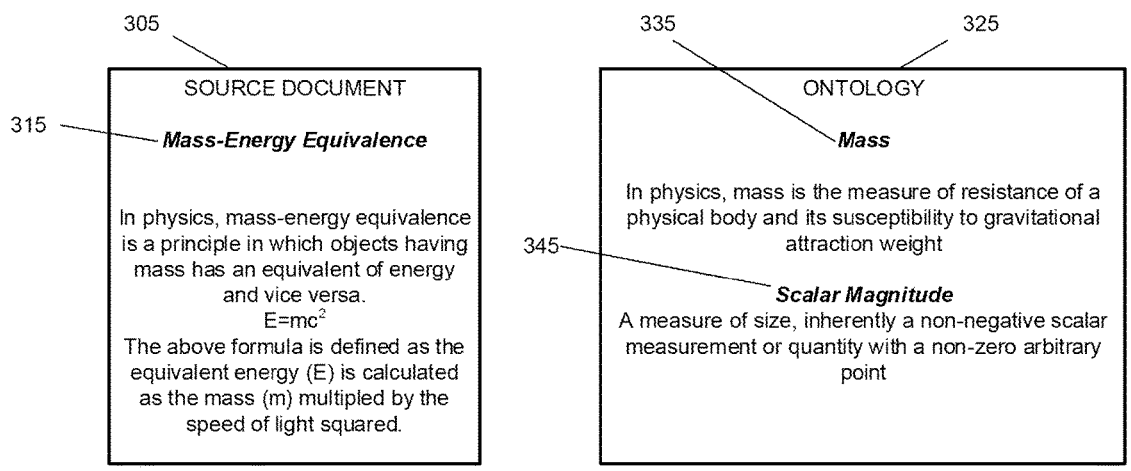
FIG. 3A is a description of a transformation extracted from an online article, consistent with an illustrative embodiment.

FIG. 3A is a description of a transformation 300A extracted from an online article, consistent with an illustrative embodiment. FIG. 3A is an illustrative example of how to extract the transformation $E=mc^2$ from an online article. By linking "m" to mass, and then to a relevant knowledge base concept, it is determined that from the ontology or knowledge base that "m" is non-negative. The source document 305 provides the mass-energy equivalence 315 and the equation for the Theory of Relativity. The ontology 325 indicates definitions of the mass 335 and scalar magnitude 345. With reference now to FIG. 3B, (which is an illustration 300B of data columns used in conjunction with the transformation in FIG. 3A) with the knowledge from the ontology that the mass is a non-negative scalar, the transformation $E=mc^2$ with column list 340 containing non-negative numbers such as the first column (age) and the third column (unknown) are non-negative values.

Example Process

With the foregoing overview of the example architecture, it may be helpful now to consider a high-level discussion of an example process. To that end, in conjunction with FIGS. 1-3A and 3B, FIG. 4 depicts a flowchart 400 illustrating a computer-implemented method for extracting symbols, consistent with an illustrative embodiment. Process 400 is illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 4:
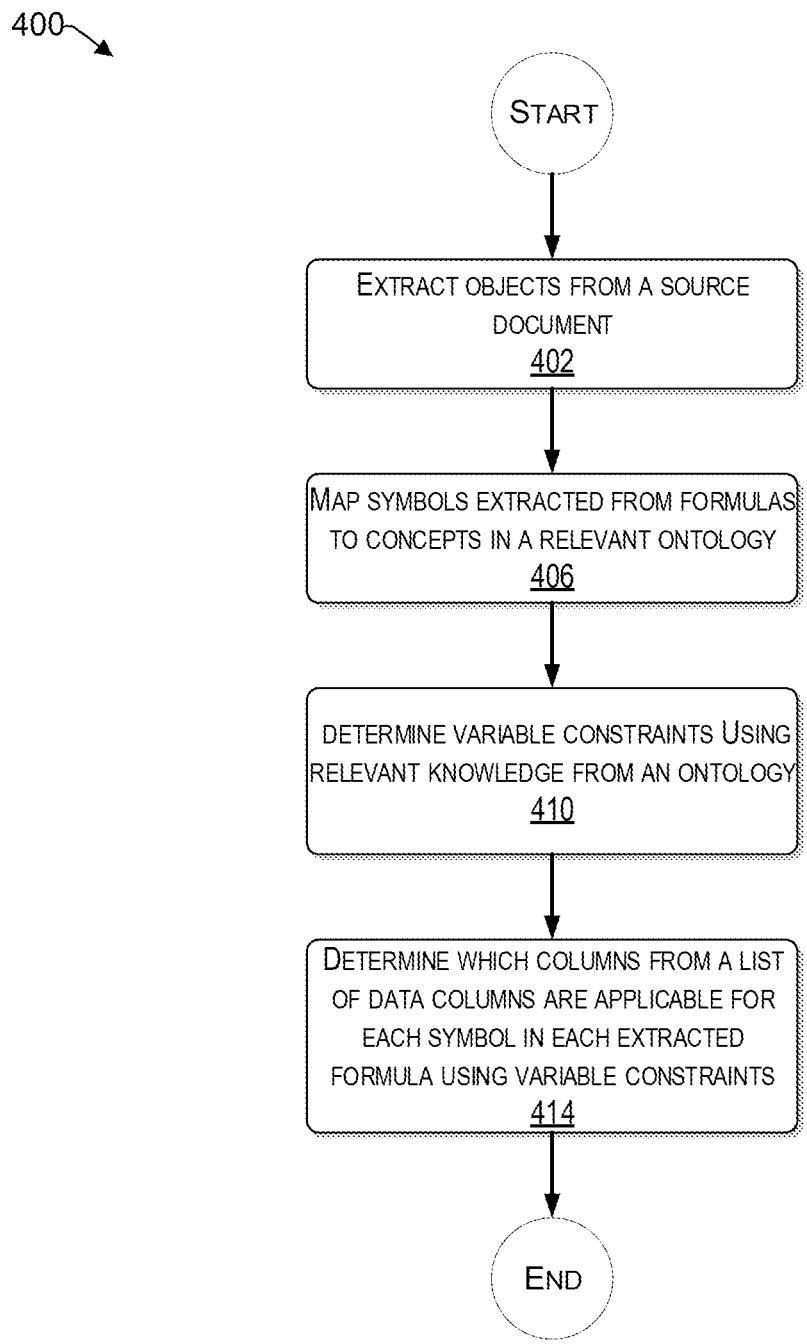
FIG. 4 is a flowchart illustrating a computer-implemented method for extracting symbols, consistent with an illustrative embodiment.

Referring now to FIG. 4, at operation 402, objects are extracted from a source document. The objects that are extracted can include, for example, mathematical objects, text, semantic labels. The aforementioned objects can be extracted by parsing structured components of a document using a deterministic algorithm. In the case of articles from, for example, Wikipedia®, which is a mix of content, mark-up (custom and HTML) and meta-data in a language called Wikitext®, the parsing includes a combination of XML, HTML Wikitext® and LaTeX® parsers.

At operation 406, symbols that are extracted from formulas are mapped to concepts in a relevant ontology. The extracted objects from operation 402 are processed to associate each variable ID with its descriptive text by a procedure that includes extracting all sentences having the variable ID, extracting all noun phrases from the extracted sentence, and rank the noun phrases according to a most likely association with the variable ID using a ranking algorithm.

The ranking algorithm can be generated using machine learning techniques. For example, create or reuse annotated data that associates identifiers with their textual descriptions. The created or reused data is used to create positive and negative examples. A classifier is trained that learns positive and negative examples used a classifier and feature such as distance metrics, textual spans, and common identifier definition patterns. A confidence score from the classifier is used to rank noun phrases associated with an ID. It will be understood that the aforementioned ranking algorithm has been provided for illustrative purposes and the disclosure is not so limited.

At operation 410, variable constraints are determined using relevant knowledge from an ontology. For example, textual descriptions can be associated with concepts in an ontology using any of the following: semantic textual similarity techniques to match text descriptions of identifiers to textual descriptions of concepts provided by ontologies; named-entity recognition techniques to associate the descriptive text with concepts in ontologies; and/or inspect links that are associated with the textual description of an identifier.

With regard to operation 414, there is determined which columns from data columns are applicable for each symbol in each of the extracted formulas using variable constraints. For example, a knowledge base can be used to determine value constraints associated with instances of a concept. A concept "C" from a knowledge-based (KB) that is associated with the variable ID is an input. A set of classes can be built and properties that can imply value constraints associated with instances of related classes. While there are several approaches to building a set, it is most practical to have upper levels of ontologies for inspection of classes and properties and generate the set of those relevant to the issue of constraining values. For example, a property class quantity and a quality level of measurement from the upper ontology of Wikidata® are examples being relevant to value constraints.

Alternatively, a list of keywords can be generated that are relevant to value constraints (e.g., measurement, quantity, etc.) to perform a text search across upper class and property descriptions, which may be followed by an inspection of the results.

The knowledge base KB can be queried using a query language including but not limited in any way to SPARQL for classes and/or properties that relate to a concept C. The constraints implied by a property, through the implementation of a specific rule for a property can state a valid data range (must be greater than zero (e.g., non-negative)).

The variable constraints can be used to determine which columns are applicable for each symbol in each extracted formula. For example, if a column has negative values, the rule regarding non-negative values for concept C is a constraint and the data column is excluded. For each column, it can be determined whether the values of the column exhibit value properties such as numeric positive, negative, real, integer, max, or min. A list of matching columns is generated for each variable. The method ends after operation 414.

Example Particularly Configured Computer Hardware Platform

Figure 5:
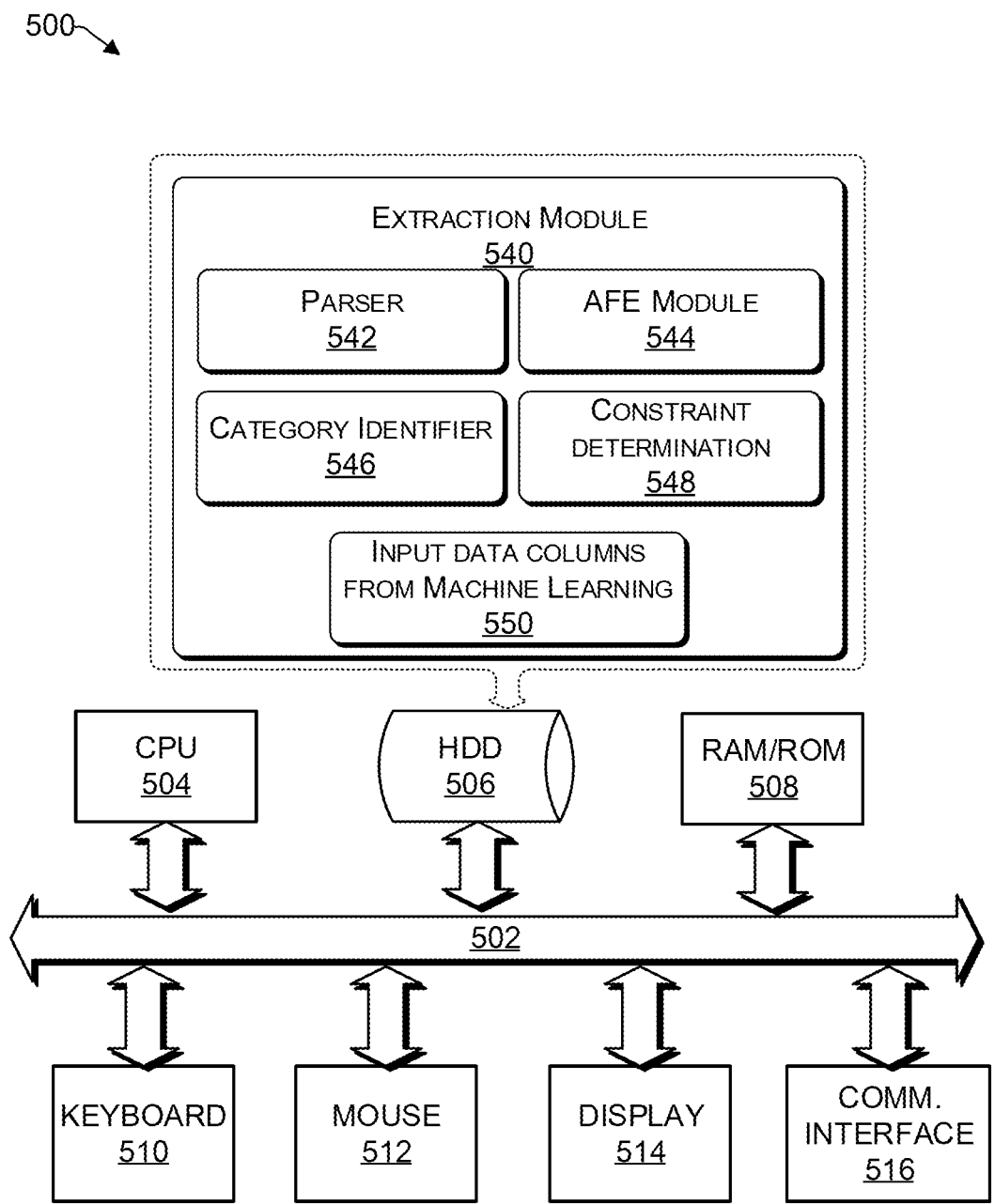
FIG. 5 is a functional block diagram illustration of a computer hardware platform for extracting symbols using Automatic Feature Engineering (AFE), consistent with an illustrative embodiment.

FIG. 5 is a functional block diagram illustration of a computer hardware platform for extracting symbols using Automatic Feature Engineering (AFE), consistent with an illustrative embodiment. In particular, FIG. 5 illustrates a particularly configured network or host computer platform 500, as may be used to implement the method shown in FIG. 4.

The computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502. The HDD 506 can include data stores.

In one embodiment, the HDD 506, has capabilities that include storing a program that can execute various processes, such as machine learning classification, sampling, meta-learning, selecting, and updating model parameters. The extraction module 540, in a manner described herein above, is configured to manage the overall process of extracting variable properties in automated feature engineering.

The parser module 542 is configured to parse through documents and identify, for example, mathematical formulae, symbols (e.g., Greek letters that stand for certain properties in science and math), and variables. Structured components of a document may be parsed using a deterministic algorithm. Other types of document properties may also be parsed (e.g. certain words, images, etc.).

The AFE module 544 is configured for executing an automatic feature engineering application. As discussed herein above, the AFE expands a core transformation and can discover features not recognized in the document. The AFE can generate mathematic transformations of formulas, properties of symbols in the formulas, and a determination regard the data to apply to an input set.

The category identifier module 546 is used to categorize, and identify formulas embedded in documents, or some other setting, that has been placed into a category allowing the domain of the formula to be determined.

The constraint determination module 548 determines, for example, whether a feature generated through e.g., AFE, fits within certain constraints. A determination is made regarding data input columns as to the columns having data with a content that conforms to the constraints, so as not to waste computational resources. Input data columns 550 generated by, for example, a machine learning model, provides various content. Some of the input data columns 550 may have subject matter that conforms to the determined constraints.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
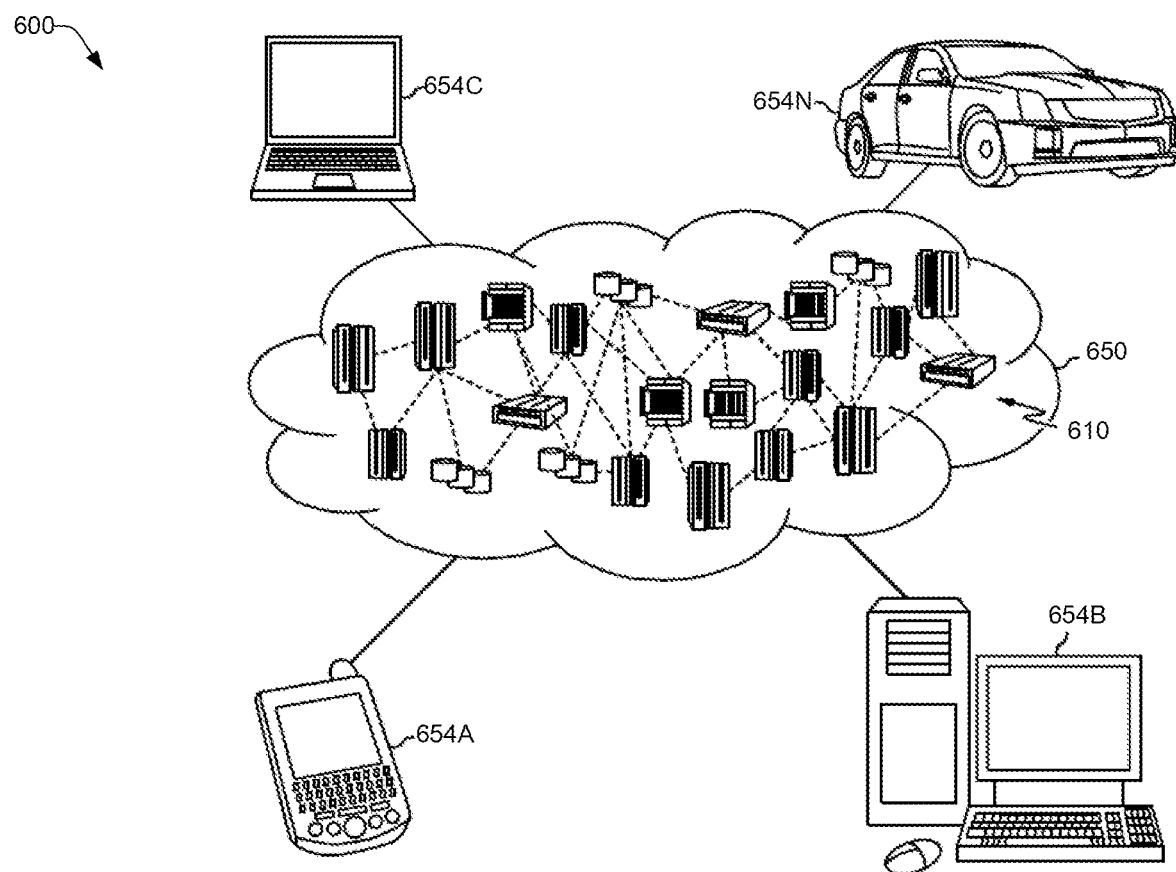
FIG. 6 depicts an illustrative cloud computing environment, consistent with an illustrative embodiment.

Referring now to FIG. 6, an illustrative cloud computing environment 600 utilizing cloud computing is depicted. As shown, cloud computing environment 600 includes cloud 650 having one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms, and/or software as services for which a cloud consumer does not need to maintain resources on a local computing device. It is understood that the types of computing devices 654A-N shown in FIG. 6 are intended to be illustrative only and that computing nodes 610 and cloud computing environment 600 can communicate with any type of computerized device over any type of network and/or network addressable connection (e.g., using a web browser).

Figure 7:
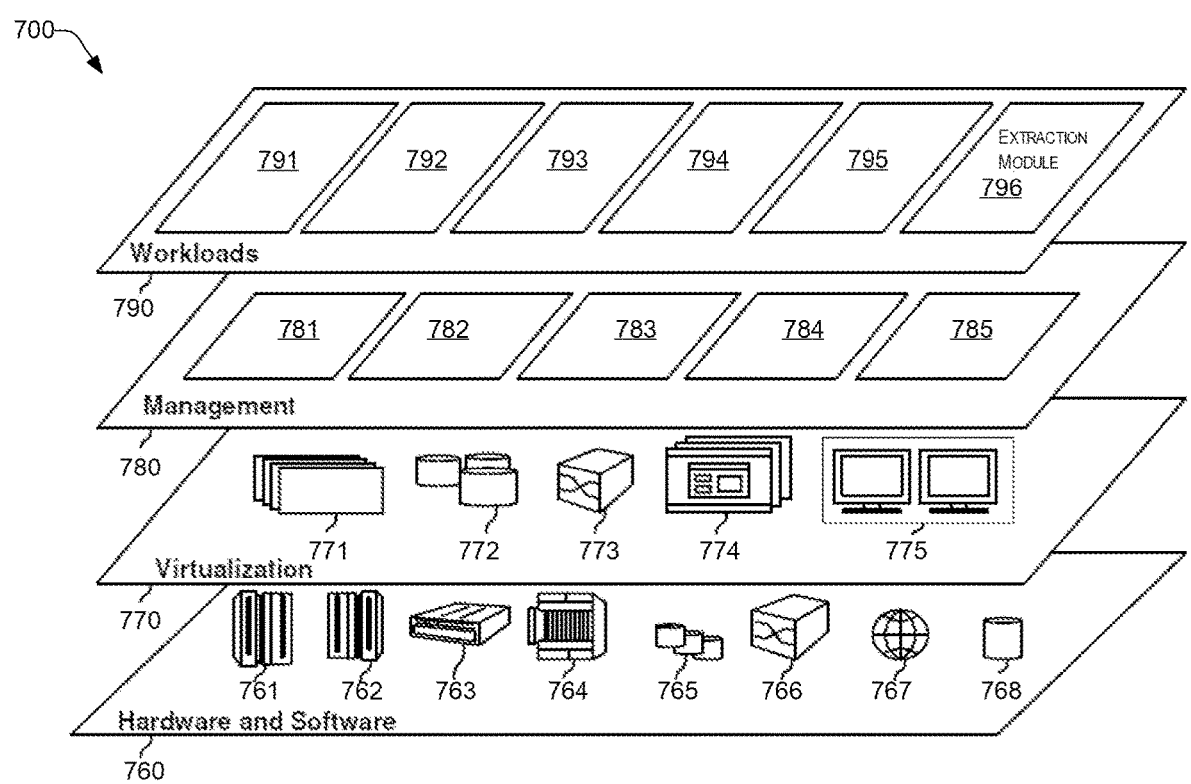
FIG. 7 depicts a set of functional abstraction layers provided by a cloud computing environment, consistent with an illustrative embodiment.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 include hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and an extraction module 796 configured to determine a similarity between model-generated data and observed data and to update model parameters as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of extracting properties of one or more variables of a mathematical transformation in a document identified by automatic feature engineering (AFE), the method comprising:
    parsing the document to extract at least one of:
        a mathematical formula including identifying data;
        a textual description of the one or more variables of the mathematical transformation; or
        a category identifier to which the document belongs;
    determining constraints applicable to one or more variables extracted from the mathematical transformation in the document, comprising, for each of the one or more extracted variables, determining at least one of (i) whether the extracted variable is non-negative, (ii) whether the extracted variable is an integer, (iii) whether the extracted variable is a real number, or (iv) a range of the extracted variable;
    excluding, from the document, data columns that are determined to be not within the constraints of the one or more extracted variables;
    reducing computational overhead by operating a machine learning model based on the document on which the data columns were excluded; and
    automatically generating at least one candidate feature from a portion of an input data that conforms to the determined constraints.

2. The computer-implemented method of claim 1, wherein the input data is arranged into data input columns, and the computer-implemented method further comprises performing one or more of a regression operation, a clustering operation, a prediction operation, or a classification operation using the generated at least one candidate feature by applying the mathematical transformation to the data input columns having data content that conforms to the determined constraints.

3. The computer-implemented method of claim 1, further comprising extracting an identifier label from the document that identifies the variables of the mathematical transformation.

4. The computer-implemented method of claim 3, further comprising extracting from the identifier label an identifier name including semantic information associated with identities of the variables of the mathematical transformation.

5. The computer-implemented method of claim 3, further comprising extracting from the identifier label an identifier name based on a domain-specific convention.

6. The computer-implemented method of claim 5, further comprising determining at least one constraint of the one or more variables of the mathematical transformation in the document based on a content of the document.

7. The computer-implemented method of claim 5, wherein the determining constraints applicable to the one or more properties of the variables further comprises determining at least one constraint of the one or more variables of the mathematical transformation in the document based on external information comprising one or more of ontologies, industry standards, or regulatory codes.

8. A computing device configured for automated Feature Engineering (AFE) that extracts properties of one or more variables of a mathematical transformation discovered in a document, the computing device comprising:
- a processor;
- a memory coupled to the processor, the memory storing instructions to cause the processor to perform acts comprising:
  - parsing the document to extract at least one of:
    - a mathematical formula including identifying data;
    - a textual description of the one or more variables of the mathematical transformation; and
    - a category identifier to which the document belongs;
  - determining constraints applicable to one or more variables extracted from the mathematical transformation in the document, comprising, for each of the one or more extracted variables, determining at least one of (i) whether the extracted variable is non-negative, (ii) whether the extracted variable is an integer, (iii) whether the extracted variable is a real number, or (iv) a range of the extracted variable;
  - excluding, from the document, data columns that are determined to be not within the constraints of the one or more extracted variables;
  - reducing computational overhead by operating a machine learning model based on the document on which the data columns were excluded; and
  - automatically generating at least one candidate feature from a portion of an input data that conforms to the determined constraints.

9. The computing device of claim 8, wherein the instructions cause the processor to perform an additional act comprising performing at least one of a regression operation, a clustering operation, a prediction operation, or a classification operation using the generated at least one candidate feature by applying the mathematical transformation to the data input columns having data content that conforms to the determined constraints.

10. The computing device of claim 8, wherein the instructions cause the processor to perform an additional act comprising extracting an identifier label from the document that identifies the variables of the mathematical transformation.

11. The computing device of claim 10, wherein the instructions cause the processor to perform an additional act comprising extracting from the identifier label an identifier name including semantic information associated with the identities of the variables of the mathematical transformation.

12. The computing device of claim 10, wherein the instructions cause the processor to perform an additional act comprising extracting from the identifier label an identifier name based on a domain-specific convention.

13. The computing device of claim 8, wherein the instructions cause the processor to perform an additional act comprising determining at least one constraint of the one or more variables of the mathematical transformation in the document based on a content of the document.

14. The computing device of claim 8, wherein the determining constraints applicable to the one or more properties of the variables further comprises determining at least one constraint of the one or more variables of the mathematical transformation in the document based on external information comprising one or more of ontologies, industry standards, or regulatory codes.

15. The computing device of claim 8, wherein the instructions cause the processor to perform additional acts comprising:
- extracting one or more identifiers from the document that identify the variables of the mathematical transformation; and
- matching the one or more extracted identifiers with concepts known in an industry class.

* * * * *